(12) United States Patent
Inaba

(10) Patent No.: US 9,689,503 B2
(45) Date of Patent: Jun. 27, 2017

(54) MANIFOLD SOLENOID VALVE

(71) Applicant: Koganei Corporation, Koganei-shi, Tokyo (JP)

(72) Inventor: Joji Inaba, Koganei (JP)

(73) Assignee: Koganei Corporation, Koganei-shi, Tokyo (JP)

( * ) Notice: Subject to any disclaimer, the term of this patent is extended or adjusted under 35 U.S.C. 154(b) by 61 days.

(21) Appl. No.: 14/669,024

(22) Filed: Mar. 26, 2015

(65) Prior Publication Data

US 2015/0276079 A1    Oct. 1, 2015

(30) Foreign Application Priority Data

Mar. 27, 2014   (JP) ................................ 2014-065096

(51) Int. Cl.
F16K 11/22      (2006.01)
F16K 27/00      (2006.01)
(Continued)

(52) U.S. Cl.
CPC ............ F16K 27/003 (2013.01); F16K 31/06 (2013.01); *F15B 13/0821* (2013.01); *Y10T 137/87885* (2015.04)

(58) Field of Classification Search
CPC ......... Y10T 137/87885; F15B 13/0817; F15B 13/0821; F15B 13/0825; F15B 13/0828;
(Continued)

(56) References Cited

U.S. PATENT DOCUMENTS 3,457,943 A  *  7/1969  Kawabata ........... F15B 13/0817
                                                    137/269
3,542,073 A  *  11/1970 Holbrook .................. F15C 3/02
                                                    137/625.66
(Continued)

FOREIGN PATENT DOCUMENTS

JP       550-123915      10/1975
JP       H04119601 A      4/1992
(Continued)

*Primary Examiner* — Seth W Mackay-Smith
(74) *Attorney, Agent, or Firm* — McCormick, Paulding & Huber LLP

(57) ABSTRACT

An object of the present invention is to improve assembly workability of a manifold solenoid valve. A manifold solenoid valve is assembled by connecting each valve base 12 to an adjacent valve base with a connecting attachment 13, each valve base 12 is provided with: an air supply hole 32 communicating with an air supply port of a corresponding solenoid valve; an exhaust hole 33 communicating with an exhaust port of the corresponding solenoid valve; and an output hole 31 communicating with an output port of the corresponding solenoid valve, each side part of one end part of each valve base 12 is provided with a first protruding part 41, and each side part of the other end part of each valve base 12 is provided with a second protruding part 42, and the connecting attachment 13 has: a first clamp piece 53 provided with a claw part 53 engaging with the first protruding part 41; and a second clamp piece 52 provided with a claw part 54 engaging with the second protruding part 42.

6 Claims, 8 Drawing Sheets

(51) Int. Cl.
*F16K 31/06* (2006.01)
*F15B 13/08* (2006.01)

(58) Field of Classification Search
CPC ... F15B 13/081; F15B 13/0814; F16K 27/003
USPC ....... 285/124.1, 124.3, 124.4, 124.5, 133.21, 285/133.3, 139.2, 141.1, 239; 251/129.15
See application file for complete search history.

(56) References Cited

U.S. PATENT DOCUMENTS

| | | | | |
|---|---|---|---|---|
| 4,082,324 A * | 4/1978 | Obrecht | ............. | F15B 13/0814 137/271 |
| 4,524,807 A * | 6/1985 | Toliusis | ............. | F15B 13/0817 137/269 |
| 5,462,087 A * | 10/1995 | Fukano | ............. | F15B 13/0825 137/596.16 |
| 5,529,088 A * | 6/1996 | Asou | ................... | F15B 13/0825 137/271 |
| 5,704,399 A * | 1/1998 | Hayashi | ............. | F15B 13/0817 137/271 |
| 6,039,358 A * | 3/2000 | Stoll | .................... | F16K 27/003 285/23 |
| 6,832,788 B2 * | 12/2004 | Fukano | ................ | F16L 37/144 285/124.4 |
| 6,874,537 B2 * | 4/2005 | Hayashi | ............. | F15B 13/0814 137/269 |
| 7,216,843 B2 * | 5/2007 | Fukano | ............... | F15B 13/0814 251/129.01 |
| 7,874,316 B2 * | 1/2011 | Okabe | ................ | F15B 13/0821 137/884 |

FOREIGN PATENT DOCUMENTS

| | | |
|---|---|---|
| JP | H04-119601 | 10/1992 |
| JP | 2003314721 A | 11/2003 |

* cited by examiner

MANIFOLD SOLENOID VALVE

CROSS-REFERENCE TO RELATED APPLICATION

The present application claims priority from Japanese Patent Application No. 2014-065096 filed on Mar. 27, 2014, the content of which is hereby incorporated by reference into this application.

TECHNICAL FIELD OF THE INVENTION

The present invention relates to a manifold solenoid valve provided with a plurality of solenoid valves.

BACKGROUND OF THE INVENTION

Conventionally, a solenoid valve is used for controlling supply and supply stop of compressed air for a pneumatic apparatus such as a pneumatic cylinder, and for controlling a pneumatic circuit for selecting and switching pneumatic circuits. An apparatus composed as an aggregation of two or more solenoid valves is referred to as "manifold solenoid valve". There are two different types including an integrated type and a stacking type in this manifold solenoid valve. In the integrated type, an aggregation of two or more solenoid valves is carried out by mounting two or more solenoid valves on a large-sized manifold block formed with a common air supply flow passage and a common exhaust flow passage. On the other hand, the stacking type is also referred to as "divided type", and an aggregation of two or more solenoid valves is carried out by mounting two or more solenoid valves on respective separated small manifold blocks, that is, mounting pedestals, and connecting the manifold blocks to each other.

One example of a stacking type manifold solenoid valve is disclosed in for example Patent Documents 1 and 2, the manifold solenoid valve has manifold blocks on which two or more solenoid valves are respectively mounted, and the manifold block has the shape of a rectangular parallelepiped. Each manifold block is provided with a mounting surface, that is, a mounting pedestal on which the solenoid valve is mounted, and formed with a passage via which air is flowed. The manifold solenoid valve is assembled by connecting manifold blocks adjacent to each other with a connecting member.

PRIOR ART DOCUMENTS

Patent Documents

Patent Document 1: Japanese Patent Application Laid-Open Publication No. 2003-314721; and
Patent Document 2: Japanese Utility Model Application Laid-Open Publication No. H04-119601

SUMMARY OF THE INVENTION

In a manifold solenoid valve described in Patent Document 1, two manifold blocks adjacent to each other are connected to each other by using a connecting pin with which connection is carried out at the distal end part of the manifold block, and a connecting plate with which connection is carried out at the rear end part thereof.

In this way, two manifold blocks adjacent to each other are connected to each other by connection of the distal end part and the rear end part with the connecting pin and the like as a connecting member.

A manifold solenoid valve described in Patent Document 2 has manifold blocks each having an abutting face formed with a concave surface, and a circular hole is formed by concave surfaces of two manifold blocks. Those manifold blocks adjacent to each other are connected by inserting a coupling rod as a connecting member in the circular hole, and pivoting it.

In the above-mentioned conventional manifold solenoid valve, three ports, that is, air supply port, output port, and exhaust port open on the bottom face of the solenoid valve having the shape of a rectangular parallelepiped, and the manifold block has a length corresponding to the bottom face of the solenoid valve. Therefore, it is necessary to connecting the front end part and the rear end part of the manifold block with a connecting member such as a separate fixing metal, or connecting the manifold blocks with a coupling rod extending in a longitudinal direction of the manifold block. Therefore, it takes time to assemble a manifold solenoid valve to connect two or more manifold blocks.

An object of the present invention is to improve assembly workability of a manifold solenoid valve.

A manifold solenoid valve according to one aspect of the present invention, has an aggregation of two or more solenoid valve mounted on valve bases, which is assembled by connecting each valve base to an adjacent valve base with a connecting attachment, wherein each valve base is provided with: an air supply hole to form a common air supply flow passage which communicates with an air supply port of a corresponding solenoid valve; an exhaust hole to form a common exhaust flow passage which communicates with an exhaust port of the corresponding solenoid valve; and an output hole which communicates with an output port of the corresponding solenoid valve, each side part of one end part of each valve base is provided with a first protruding part extending in a front-back direction, and each side part of the other end part of each valve base is provided with a second protruding part extending in a front-back direction, and the connecting attachment has: a first clamp piece which has two claw parts engaging with the first protruding parts of valve bases adjacent to each other; and a second clamp piece which has two claw parts engaging with the second protruding parts of valve bases adjacent to each other.

The manifold solenoid valve having an aggregation of two or more solenoid valve mounted on valve bases is assembled by connecting each valve base to an adjacent valve base with a connecting attachment, and each valve base is provided with: an air supply hole which communicates with an air supply port of a corresponding solenoid valve; an exhaust hole which communicates with an exhaust port of the corresponding solenoid valve; and an output hole which communicates with an output port of the corresponding solenoid valve, and the connecting attachment has: a first clamp piece which has two claw parts engaging with the first protruding parts of valve bases adjacent to each other; and a second clamp piece which has two claw parts engaging with the second protruding parts of valve bases adjacent to each other. Therefore, since the manifold solenoid valve can be assembled by an inserting operation of each clamp piece, it is possible to improve assembly workability of a manifold solenoid valve. Since the first and second clamp pieces are integrally connected provided to the respective ends of the connecting piece, the connecting attachment has a symmetrical structure to the connecting piece, and it is possible to assemble the manifold solenoid valve with ease by using the connecting attachment.

DESCRIPTION OF THE PREFERRED EMBODIMENTS

Figure 1:
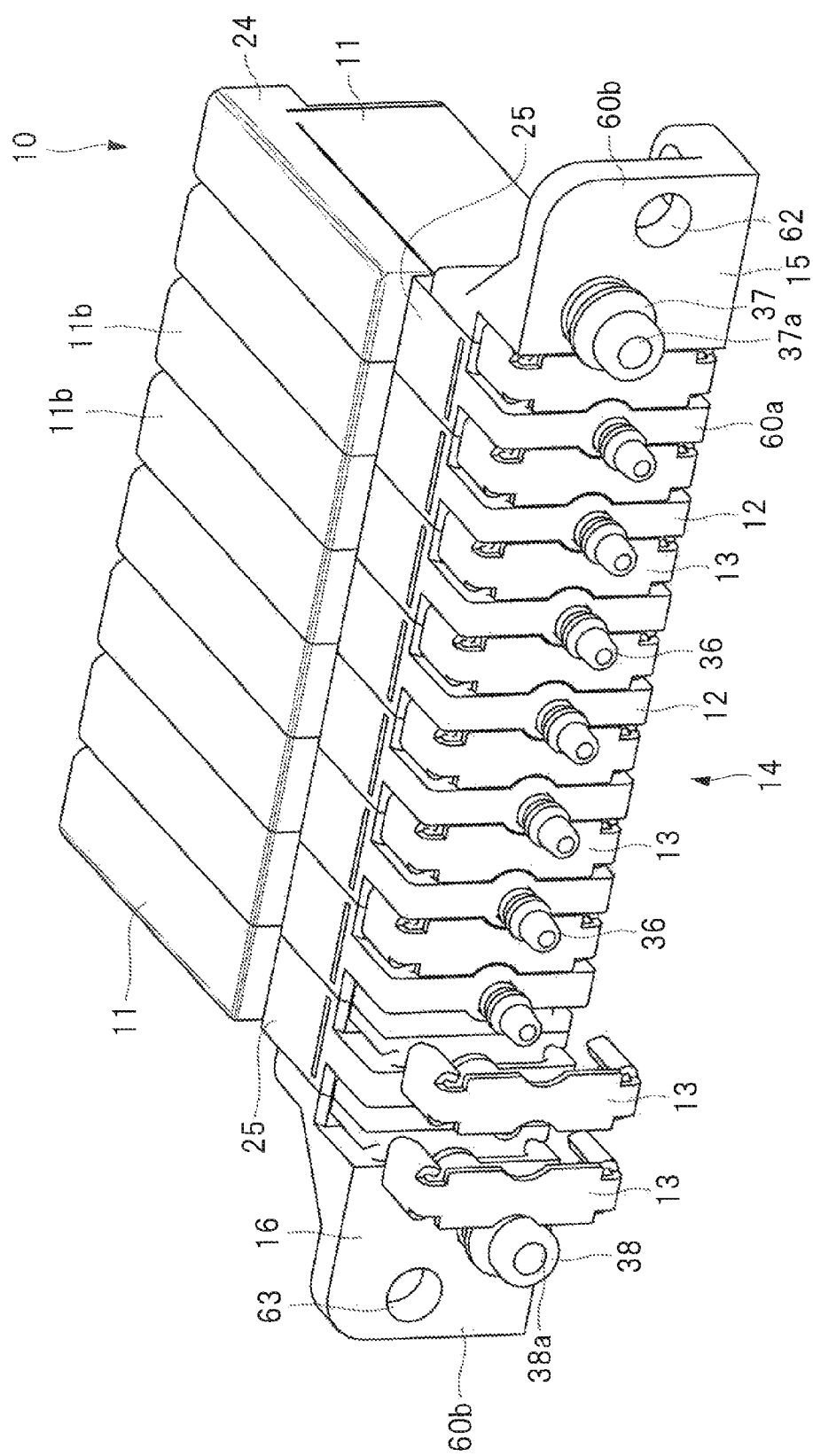
FIG. 1 is a perspective view showing an outline of a manifold solenoid valve according to one embodiment.
Figure 2:
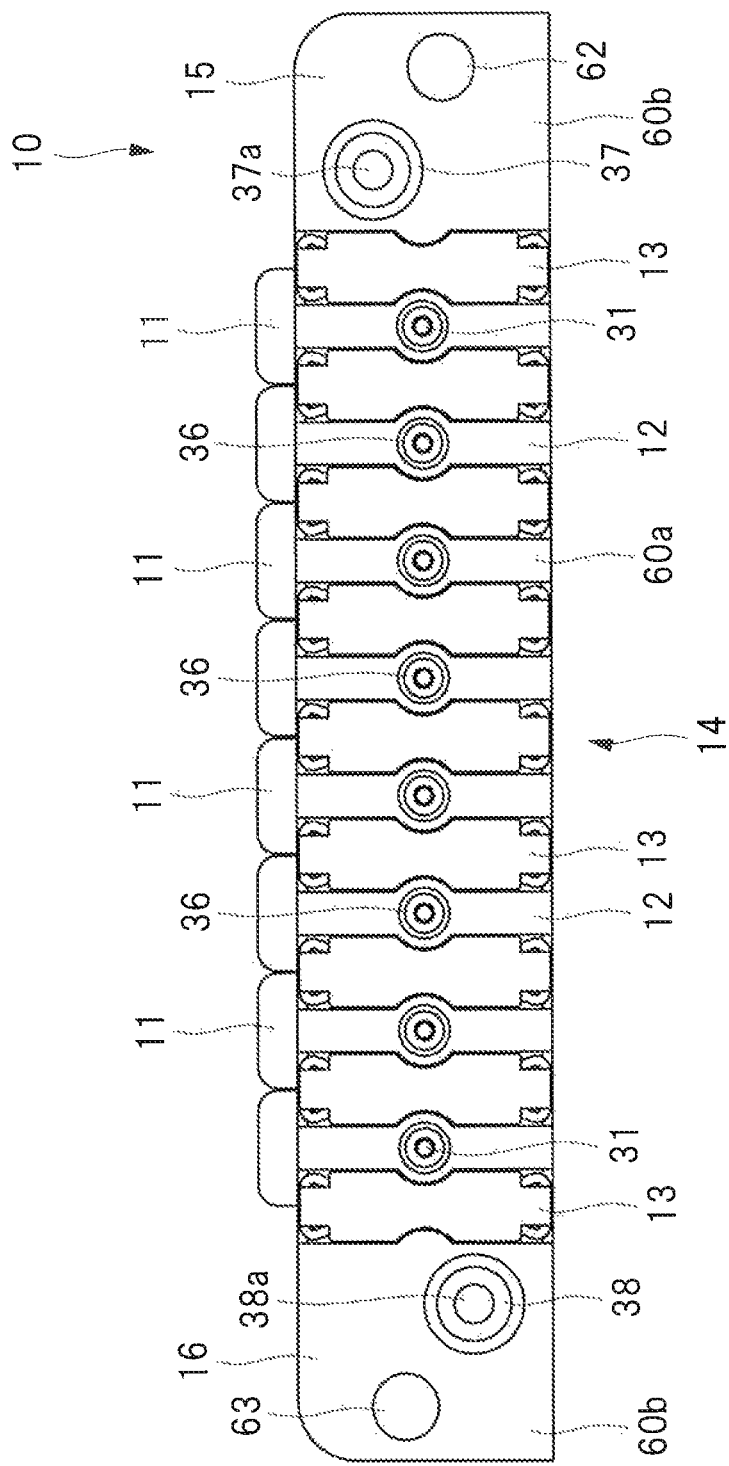
FIG. 2 is a front view of the manifold solenoid valve of FIG. 1.
Figure 3:
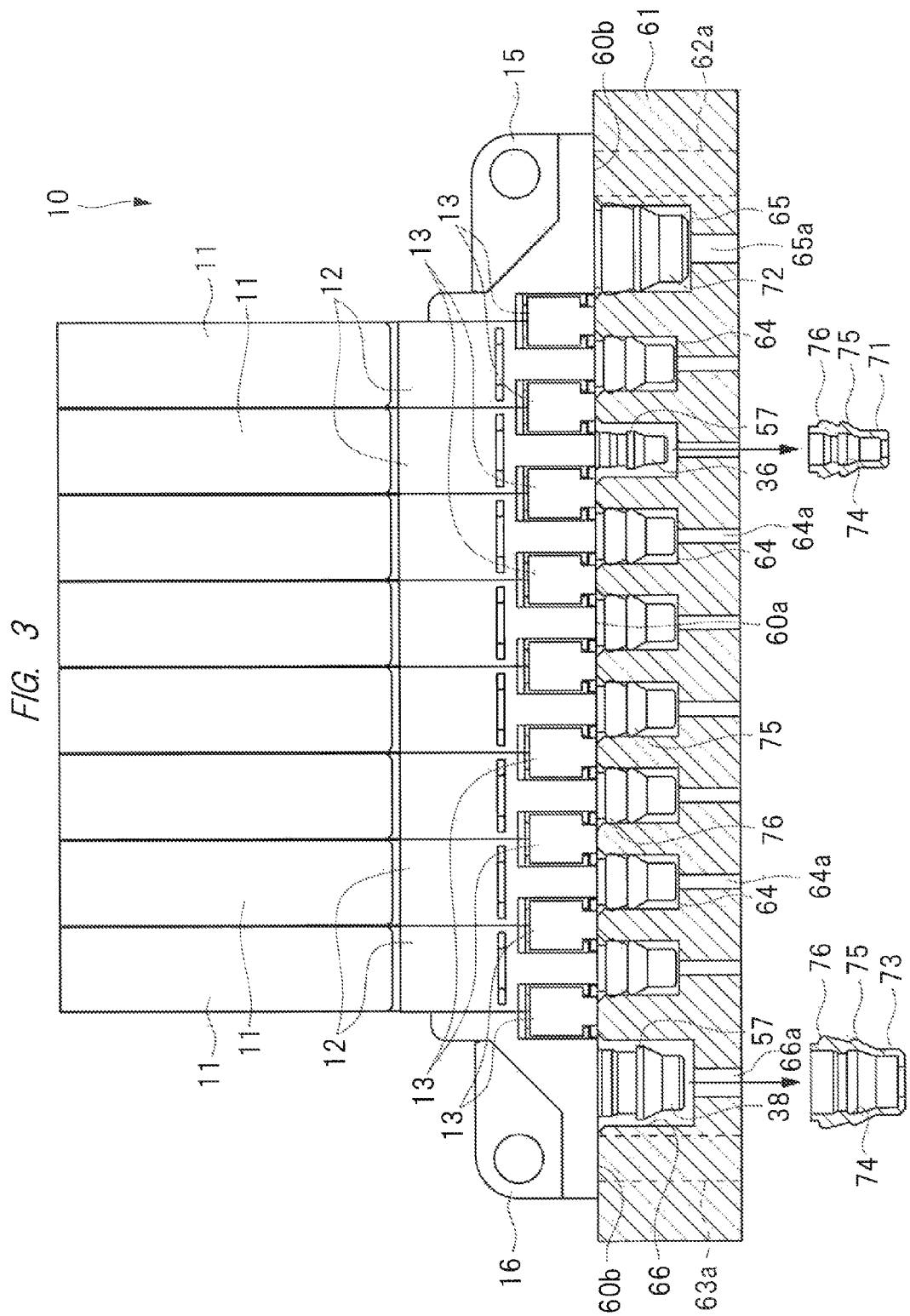
FIG. 3 is a plan view of the manifold solenoid valve attached to a flow passage block.

Hereinafter, an embodiment of the present invention will be described in detail on the basis of the attached drawings. As shown in FIGS. 1 to 3, a manifold solenoid valve 10 has two or more solenoid valves 11, and each solenoid valve 11 is mounted on a back face of a valve base 12 as a manifold block. The solenoid valves 11 are mounted on the respective valve bases 12, and the manifold solenoid valve 10 is a stacking type which is composed of aggregation of two or more solenoid valves 11. The manifold solenoid valve 10 is assembled so that the valve bases 12 are arranged side-by-side, and valve bases adjacent to each other abut on each other via their side faces. Although the manifold solenoid valve 10 has eight solenoid valves 11 in this embodiment, the manifold solenoid valve 10 having any number of solenoid valves 11 can be assembled by aggregating two or more solenoid valves 11.

Two valve bases 12 are adjacent to each other and arranged so as to abut on each other via their side faces, and connected to each other with a connecting attachment 13. As shown in the figures, a valve base assembly 14 is assembled by abutting and connecting eight valve bases 12 to each other with the connecting attachments 13. A first end block 15 is mounted on one end face of the valve base assembly 14, and a second end block 16 is mounted on the other end face of the valve base assembly 14. The end blocks 15 and 16 are connected with the connecting attachments 13 to the respective end faces of two valve bases 12 arranged on both side of the valve base assembly 14.

Figure 8:
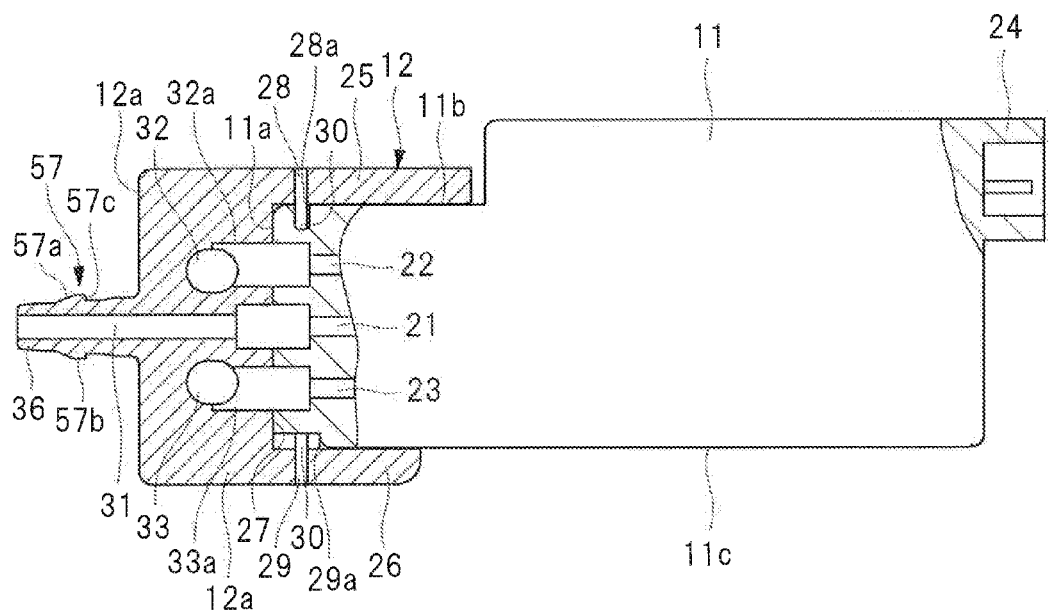
FIG. 8 is a sectional view showing a valve base to which the solenoid valve is attached.

In general, the solenoid valve 11 has the shape of a nearly rectangular parallelepiped, and output port 21, air supply port 22, and exhaust port 23 open on one end face as shown in FIG. 8. The output port 21 is provided at a central part in a vertical direction in FIG. 8, and the air supply port 22 is provided on the upper side of the output port 21, and the exhaust port 23 is provided on the lower side of the output port 21. If those ports open on a front face of the solenoid valve 11, this solenoid valve 11 is referred to as a three-port solenoid valve with those ports which open on the front face.

A valve body (not shown) is incorporated in the solenoid valve 11, and operated between a position for communicating the air supply port 22 with the output port 21 while preventing the output port 21 and the exhaust port 23 from communicating with each other, and a position for preventing the air supply port 22 and the output port 21 from communicating with each other while communicating the output port 21 with the exhaust port 23. In order to make the valve body perform the above switching operation, a solenoid (not shown), that is, an electromagnet is incorporated in the solenoid valve 11. A socket part 24 to supply a driving current to the solenoid is provided to the rear end part of the solenoid valve 11. A connector (not shown) is attached to this socket part 24.

In the solenoid valve 11, the output port 21, the air supply port 22, and the exhaust port 23 open on a front face 11a thereof, the shape thereof is a nearly rectangular parallelepiped, and a front side end part thereof is connected to the valve base 12. The valve base 12 has a body part 12a which has the shape of a nearly rectangular parallelepiped, and which extends vertically along the front face 11a of the solenoid valve 11 in FIGS. 4 and 8. One end part of the body part 12a is provided with a first fixing piece 25 protruding in a backward direction from the back face of the valve base 12, and the other end part of the body part 12a is provided with a second fixing piece 26 protruding in a backward direction in the same way. An abutting face 27 is defined between the fixing pieces 25 and 26 on the back face of the valve base 12. The solenoid valve 11 is mounted on the valve base 12 by abutting the front face 11a of the solenoid valve 11 on the abutting face 27.

When the solenoid valve 11 is mounted on the valve base 12, the first fixing piece 25 comes in contact with a distal end part of a top side face 11b of the solenoid valve 11, and the second fixing piece 26 comes in contact with a distal end part of a bottom side face 11c of the solenoid valve 11. In this way, the valve base 12 is mounted on the end part of the solenoid valve 11 so as to cover the front face side end part of the solenoid valve 11, that is, the front face 11a of the distal end part, part of the top side face 11b, and part of the bottom side face 11c.

The first fixing piece 25 is provided with a slit 28, and a slit 28a is provided on a top face side of the distal end part of the solenoid valve 11 so as to correspond to the slit 28. The second fixing piece 26 is also provided with a slit 29, and a slit 29a is provided on a bottom face side of the distal end part of the solenoid valve 11 so as to correspond to the slit 29. The solenoid valve 11 is fixed to the valve base 12 by inserting a fastener 30 in both slits 28 and 28a.

In the valve base 12, as shown in FIG. 8, an output hole 31 communicating with the output port 21 of the solenoid valve 11 is provided so as to open on the abutting face 27 of the valve base 12. The valve base 12 is provided with an air supply hole 32 penetrating in a width direction. The air supply hole 32 communicates with the air supply port 22 of the solenoid valve 11 via a communicating hole 32a which opens on the abutting face 27 of the valve base 12. In the valve base 12, an exhaust hole 33 is provided while penetrating in the width direction. The exhaust hole 33 communicates with the exhaust port 23 of the solenoid valve 11 via a communicating hole 33a which opens on the abutting face of the valve base 12. When two or more valve base 12 abut on each other, a common air supply flow passage communicating with the air supply port 22 of each solenoid valve 11 is formed by the air supply hole 32. In the same way, when two or more valve base 12 abut on each other, a common exhaust flow passage communicating with the exhaust port 23 of each solenoid valve 11 is formed by the exhaust hole 33.

Figure 4:
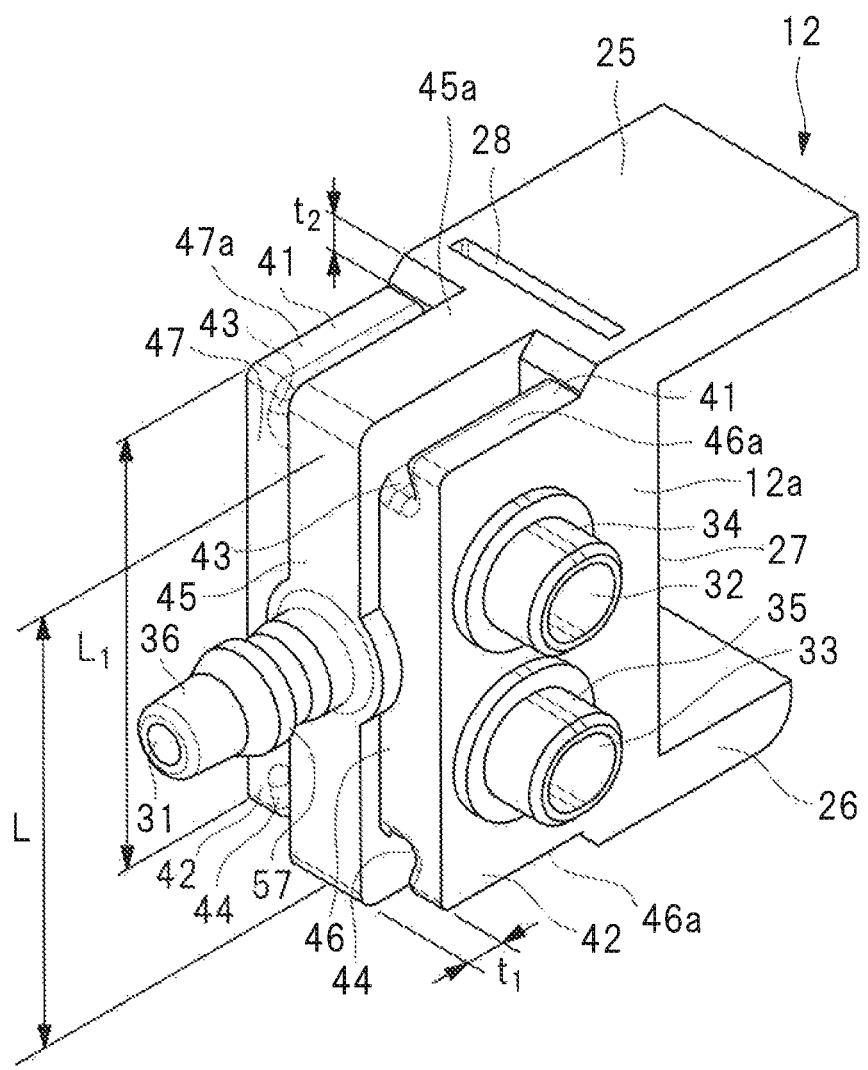
FIG. 4 is a perspective view showing a valve base to which a solenoid valve is mounted.

As shown in FIG. 4, on one side face of the valve base 12, a connecting cylinder part 34 in which the air supply hole 32 is formed is provided integrally, and the connecting cylinder part 34 protrudes from the side face. In the same way, on one side face of the valve base 12, a connecting cylinder part 35 in which the exhaust hole 33 is formed is provided uniformly, and the connecting cylinder part 35 protrudes from the side face. On the other side face of the valve base 12, a fitting hole (not shown), into which each of connecting cylinder parts 34 and 35 of the other valve base 12 adjacent to each other is fitted is provided. Each fitting hole has a larger diameter than each of the connecting cylinder parts 34 and 35. Therefore, when two or more valve base 12 abut on each other, the common air supply flow passage and exhaust flow passage are formed in a state where the connecting cylinder parts 34 and 35 of one valve base 12 are fitted in the fitting holes of the other valve base 12, respectively. Between connecting cylinder parts 34 and 35 and fitting holes, sealing is carried out by a sealing member (not shown).

As shown in FIG. 8, an output joint 36 is provided so as to protrude from the front face of each valve base 12, and the output hole 31 opens on a distal end face of the output joint 36. The end block 15 is, as shown in FIG. 1, provided with an air supply joint 37 protruding in a front face side, and a communicating hole 37a of the air supply joint 37 communicates with the common air supply flow passage. On the other hand, the end block 16 is provided with an exhaust joint 38 protruding in a front face side, and a communicating hole 38a of the exhaust joint 38 communicates with the common exhaust flow passage.

Compressed air is supplied to the communicating hole 37a of the air supply joint 37 from an air pressure supply source (not shown). The compressed air is supplied from the air pressure supply source to the air supply port 22 of each solenoid valve 11 via the air supply hole 32. The communicating hole 38a of the exhaust joint 38 communicates with the exhaust port 23 of the solenoid valve 11 via each exhaust hole 33, and the air from each exhaust ports 23 is discharged outside from the exhaust joint 38. Therefore, when the solenoid valves 11 are selectively driven, and the air supply port 22 and the output port 21 of the solenoid valve 11 is in a communicating state, the compressed air from the output port 21 is supplied to a supplied part of an external pneumatic apparatus, etc. from the output hole 31.

One end part of the valve base 12 is shown in FIG. 4 as being an upper side part, and each side of this end part is provided with a first protruding part 41 extending in a front-back direction of the valve base 12. The other end part of the valve base 12 is shown in FIG. 4 as being a lower side part, and each side of this end part is provided with a second protruding part 42 extending in a front-back direction. Concave grooves 43 and 44 are respectively provided on center sides of protruding parts 41 and 42. In this way, in the valve base 12, two first protruding parts 41 face in respective directions opposite to each other, and two second protruding parts 42 face in respective directions opposite to each other.

Figure 5:
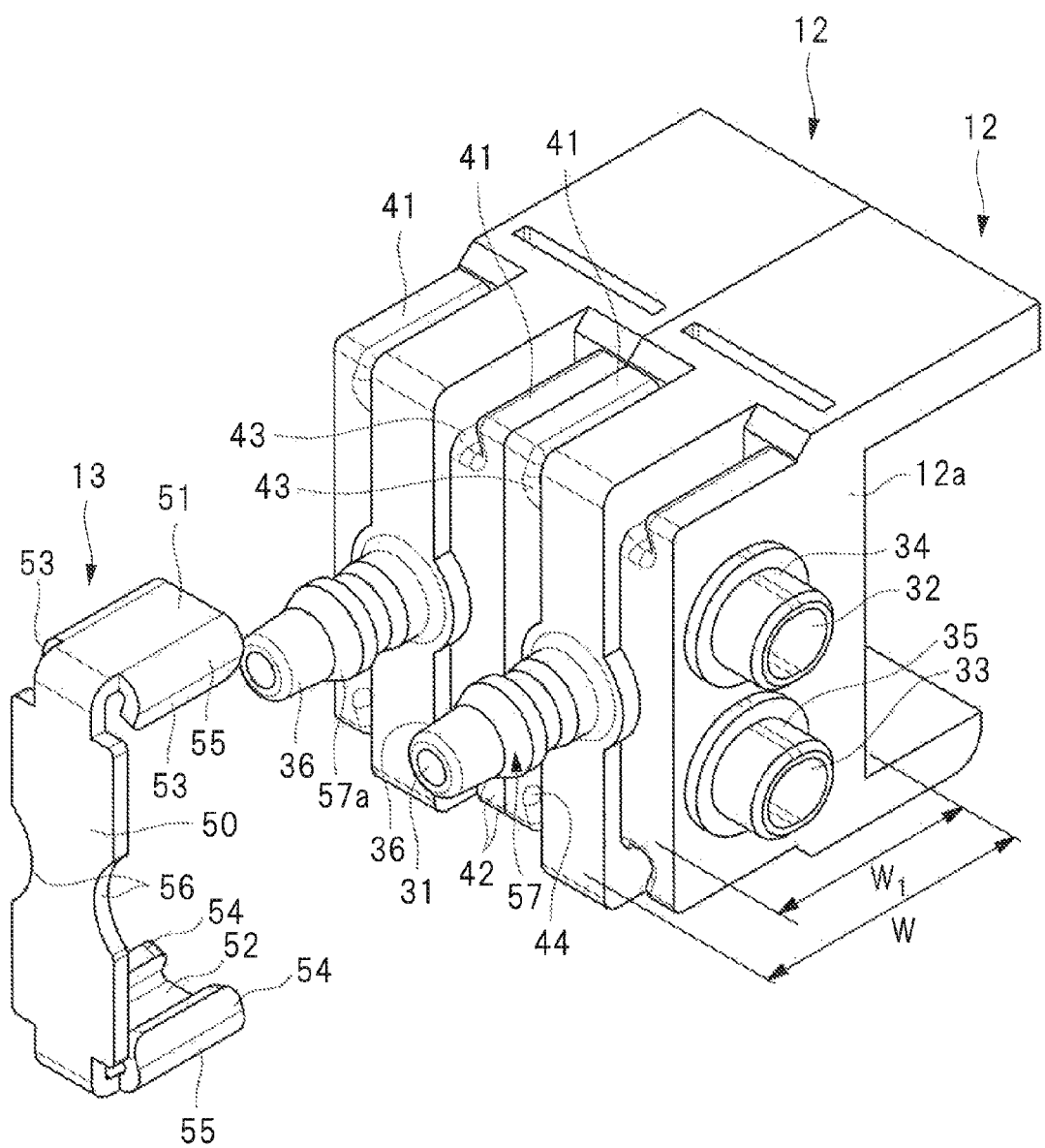
FIG. 5 is a perspective view showing two valve bases abutting on each other, and a connecting attachment.

The front face of the valve base 12 has a central part 45, and side parts 46 and 47 in a width direction thereof (hereinafter referred to as "first side parts 46 and 47"). The first side parts 46 and 47 are retreated from the central part 45, and an uneven part having a measurement "t1" is provided between the central part 45 and the first side parts 46 and 47. The end face of the upper and lower sides of the valve base 12 has: a central part 45a which is continuous to the central part 45 of the front face; and upper and lower side parts 46a and 47a in a height direction (hereinafter referred to as "second side parts 46a and 47a"), and the second side parts 46a and 47a are continuous to the first side parts 46 and 47 of the front face, respectively. The second side parts 46a and 47a are retreated from the central part 45a, and an uneven part having a size "t2" is provided between the central part 45a and the second side parts 46a and 47a. Therefore, the length "L1" of the body part 12a of the valve base 12 in the second side parts 46a and 47a are shorter than the length "L" in the height direction of the central part as shown in FIG. 4. Furthermore, as shown in FIG. 5, a front-back direction length "W1" between the first side parts 46 and 47 of the front face of the valve base 12 and the abutting face 27 of the back face are shorter than a front-back direction length "W" in a front-back direction of the central part. The lengths "t1" and "t2" of the uneven parts are almost the same as each other.

Figure 6:
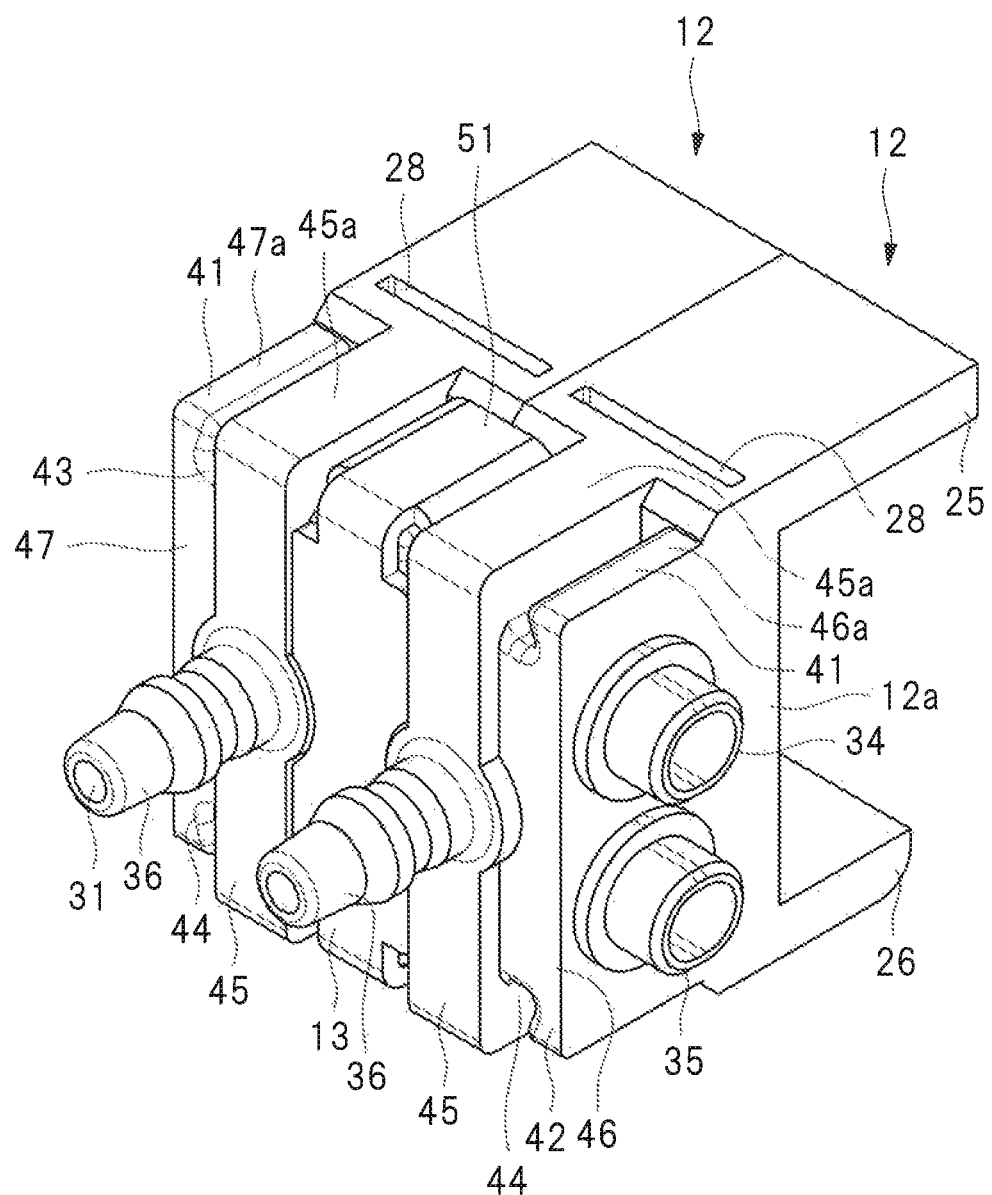
FIG. 6 is a perspective view showing two valve bases connected to each other by the connecting attachment.
Figure 7A:
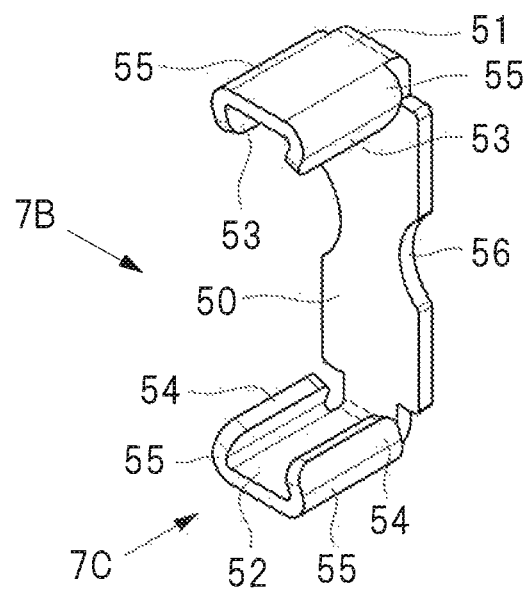
FIG. 7A is a perspective rear view showing the connecting attachment.
Figure 7B:
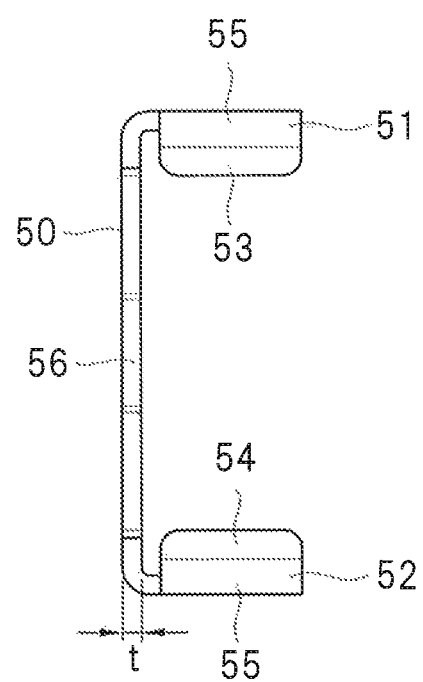
FIG. 7B is a view in the direction of an arrow "7B" of FIG. 7A, showing the connecting attachment.
Figure 7C:
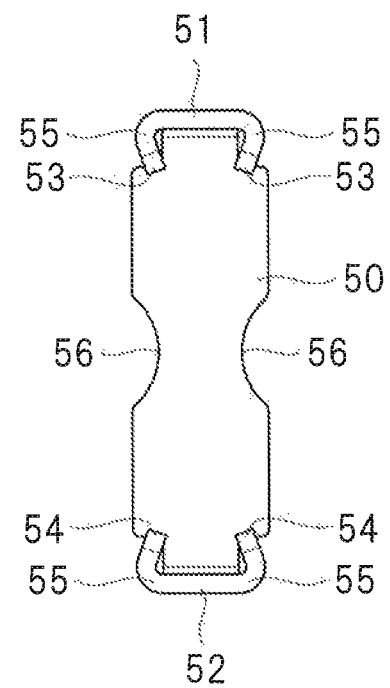
FIG. 7C is a view in the direction of an arrow "7C" of FIG. 7A, showing the connecting attachment.

The connecting attachment 13 has, as shown in FIGS. 5 to 7, a nearly-rectangular connecting piece 50, a first clamp piece 51, and a second clamp piece 52. The connecting piece 50 faces with one of the right and left side parts of the front face of one of two valve bases 12 adjacent to each other, and the other of the right and left side parts of the front face of the other of said two valve bases 12. The first clamp piece 51 is integrally provided to one end part of the connecting piece 50, and the second clamp piece 52 is integrally provided to the other end part of the connecting piece 50. Each of the clamp pieces 51 and 52 is bent in a right angle direction with respect to the connecting piece 50, and formed integrally with the connecting piece 50. In the first clamp piece 51, two claw parts 53 engaged with the first protruding part 41 of two valve bases 12 adjacent to each other are provided. In the same way, in the second clamp piece 52, two claw parts 54 engaged with the second protruding part 42 of two valve bases 12 adjacent to each other are provided.

The clamp pieces 51 and 52 are the same in shape as each other, integral with respective ends of the connecting piece 50, and they face each other. The connecting attachment 13 has a symmetrical structure to the connecting piece 50 as a center thereof. Therefore, one of the clamp pieces is defined as "the first clamp piece 51", while the other of the clamp pieces is defined as "the second clamp piece 52". The connecting attachment 13 is fabricated by press working of a steel plate having a thickness "t", and the thickness "t" is almost the same as the measurement "t1" and "t2" of the above mentioned uneven parts.

By inserting the claw part 53 in the concave groove 43, the claw part 53 is engaged with the first protruding part 41. In the same way, by inserting the claw part 54 in the concave groove 44, the claw part 54 is engaged with the second protruding part 42. Each of the claw parts 53 and 54 has bent parts 55 which are received in the respective concave grooves 43 and 44.

Since two clamp pieces 51 and 52 are integral with the connecting piece 50 in the connecting attachment 13, when two valve bases 12 adjacent to each other are connected to each other, an operator holds the connecting piece 50, and inserts the claw parts 53 and 54 in the respective concave grooves 43 and 44. Therefore, valve bases 12 can be connected at both upper and lower ends thereof at the same time by the inserting operation at one time.

Cutout parts 56 are respectively provided to the right and left side of the longitudinal central part of the connecting piece 50 of the connecting attachment 13, and when the connecting attachment 13 is attached to the valve base 12, a peripheral part of the output joint 36 is partially received in the cutout part 56.

FIG. 4 shows one valve base 12, and FIG. 5 shows two valve bases 12 abutting on their side faces. As shown in FIG. 5, the connection of two valve bases 12 abutting on each other is made via the following process. Firstly, the connecting attachment 13 is brought close to the valve base 12 in the front-back direction of the valve base 12. Then, the claw parts 53 and 54 of the clamp pieces 51 and 52 are inserted into the respective concave grooves 43 and 44. When the claw part 53 is inserted in the concave groove 43, the claw part 53 comes into pressure-contact with an inner surface of the first protruding part 41, and the bent part 55 is elastically deformed, and after insertion, the claw part 53 is pressed on the inner surface of the first protruding part 41 by the elastic force of the bent part 55. In the same way, when the claw part 54 is inserted into the concave groove 44, the claw part 54 comes into pressure-contact with an inner surface of the second protruding part 42. Therefore, as shown in FIG. 6, two valve bases 12 adjacent to each other are firmly connected by the connecting attachment 13. The attaching operation of the connecting attachment 13 to the valve bases 12 adjacent to each other is only an operation by which the connecting attachment 13 is attached to the valve base 12, and the valve base 12 can be connected easily. Thereby, assembling operability to assemble the manifold solenoid valve 10 while two or more valve bases 12 are connected can be made improved.

In FIGS. 4 to 6, the solenoid valve 11 to be mounted on the valve base 12 is omitted. Before the valve bases 12 are connected to each other by the connecting attachment 13, the solenoid valves 11 may be mounted on the respective valve base 12 in advance. On the other hand, after the valve bases 12 are connected to each other by the connecting attachment 13, the solenoid valves 11 may be mounted on the respective valve bases 12.

The valve base assembly 14 shown in FIGS. 1 to 3 has eight valve bases 12 on which the solenoid valves 11 are respectively mounted. One end parts of two valve bases 12 adjacent to each other are connected to each other with the first clamp piece 51 of the connecting attachment 13, and the other end part thereof are connected to each other with the second clamp piece 52 of the connecting attachment 13. The end block 15 abuts on one end of the valve base assembly 14, and the end block 16 abuts on the other end of the valve base assembly 14. The end blocks 15 and 16 are fastened by the connecting attachments 13 to the valve bases 12 arranged at end parts of the valve base assembly 14, respectively.

On an outer peripheral surface of the output joint 36, as shown in FIG. 8, an engaging protruding part 57 is provided so as to protrude in a radially outward direction. The engaging protruding part 57 has a tapered surface 57a becoming larger gradually in a direction from a distal end side to a rear end part, a straight surface 57b continuous to a rear end part of the tapered surface 57a, and a radial direction surface 57c continuous to a rear end of the straight surface 57b. Also, an engaging protruding part 57 having the same shape is provided to each outer peripheral surface of the air supply joint 37 and the exhaust joint 38.

A front face formed by the valve base assembly 14 and the end blocks 15 and 16 is totally flat, since the thickness "t" of the connecting attachment 13 is almost the same as the measurement "t1" and "t2" of each uneven part. Similarly, the top side face and the bottom side face, formed by the valve base assembly 14 and the end blocks 15 and 16, are totally flat. A block mounting face 60a is formed by the flat front face of the valve base assembly 14, and the front face of the connecting attachment 13 also forms part of the block mounting face 60a. In addition, each front face of the end blocks 15 and 16 is a flat extension face 60b continuous from the block mounting face 60a. The output joint 36, the air supply joint 37, and the exhaust joint 38, each of which is used as a joint member, are arranged on the extension face 60b and block mounting face 60a which collectively form one face.

On the flat block mounting face 60a and the flat extension face 60b of the manifold solenoid valve 10, which collectively form a flat face, a flow passage block 61 is mounted as shown in FIG. 3. The end blocks 15 and 16 are respectively provided with mounting holes 62 and 63 for attaching the flow passage block 61, and the flow passage block 61 is provided with mounting holes 62a and 63a corresponding to the mounting holes 62 and 63. The flow passage block 61 is fastened on the front face of the manifold solenoid valve 10 by screw members (not shown) which are mounted in the respective mounting holes.

As shown in FIG. 3, the flow passage block 61 is provided with connecting holes 64, the output joints 36 are received in the respective connecting holes 64, the number of the output joints 36 corresponds to the number of those of the flow passage block 61, the connecting holes 64 open on the back face of the flow passage block 61, that is, an abutting face of the flow passage block 61. In the same way, in the flow passage block 61, a connecting hole 65 into which the air supply joint 37 enters, and a connecting hole 66 into which the exhaust joint 38 enters are provided. Air flow passages 64a to 66a which communicate with connecting holes 64 to 66 are respectively provided to the flow passage block 61.

The air flow passages 64a communicates with output hole 31 of the output joint 36, and the air flow passage 65a communicates with the communicating hole 37a of the air supply joint 37, and the air flow passage 66a communicates with the communicating hole 38a of the exhaust joint 38. In order to make the output hole 31 communicate with the air flow passage 64a with sealing being carried out between the output joint 36 and the connecting hole 64, as shown in FIG. 3, a joint seal member 71 is detachably attached to the output joint 36. In the same way, in order to make the communicating hole 37a communicate with the air flow passage 65a, a joint seal member 72 is detachably attached to the air supply joint 37 with sealing being carried out between the air supply joint 37 and the connecting hole 65. Furthermore, in order to make the communicating hole 38a communicate with the air flow passage 66a, a joint seal member 73 is detachably attached to the exhaust joint 38 with sealing being carried out between the exhaust joint 38 and the connecting holes 66. The joint seal member 71 is a joint seal member for output, and the joint seal members 72 and 73 are joint seal members for supply and exhaust, respectively.

In FIG. 3, the manifold solenoid valve is shown with one of eight joint seal members 71 being removed from the output joint 36, shown with the joint seal member 72 being attached to the air supply joint 37, and shown with the joint seal member 73 being removed from the exhaust joint 38.

The joint seal member 71 has an inner peripheral surface corresponding to an outer peripheral surface of the output joint 36, a recess part 74 is provided on this inner peripheral surface, and the engaging protruding part 57 of the output joint 36 is fitted into the recess part 74. Two annular protruding seal parts 75 and 76 are provided On an outer peripheral surface of the joint seal member 71 so as to come in contact with an inner peripheral surface of the connecting hole 64. An each output diameter of the protruding seal parts 75 and 76 of the joint seal member 71 to be mounted between the output joint 36 and the connecting hole 64 is larger than an inner diameter of the connecting hole 64. Therefore, when the joint seal member 71 is incorporated between the output joint 36 and the connecting hole 64, sealing is carried out between the outer peripheral surface of the output joint 36 and the inner peripheral surface of the connecting hole 64 by contraction of both protruding seal parts 75 and 76 in a radial direction, thereby surely preventing air from leaking from between the connecting hole 64 and the output joint 36 to the outside.

One protruding seal part 75 corresponds to the engaging protruding part 57 of the output joint 36. Therefore, the protruding seal part 75 is strongly pressed on the engaging protruding part 57 of the output joint 36 with the joint seal member 71 being incorporated, thereby enhancing a seal force.

The joint seal member 71, a configuration in which the outer diameter is made to be the same on the whole can also be used without the protruding seal parts 75 and 76 being provided on the outer peripheral surface. In that case, the inner peripheral surface of the joint seal member 71 comes in contact with the whole outer peripheral surface of the output joint 36. On the other hand, as mentioned above, when the protruding seal parts 75 and 76 are provided on the joint seal member 71, the outer peripheral surface of the joint seal member 71 will come in contact with the inner peripheral surface of the connecting hole 64 only at the protruding seal parts 75 and 76. Thereby, a contact strength of the joint seal member 71 to the output joint 36 becomes higher than an contact strength to the connecting hole 64. Therefore, when the flow passage block 61 is removed from the front face of the manifold solenoid valve 10, the joint seal member 71 is mounted on the output joint 36 without remaining in the connecting hole 64. Since the joint seal member 71 remains in the output joint 36 when the flow passage block 61 is removed from the manifold solenoid valve 10, replacement work of the joint seal member 71 can be performed easily.

The joint seal members 71 to 73 are the same in structure as each other, but the joint seal member 72 to be mounted on the air supply joint 37 and the joint seal member 73 to be mounted on the exhaust joint 38 are larger in diameter than the joint seal member 71 to be mounted on the output joint 36. The joint seal members 72 and 73 are the same in diameter as each other.

When the flow passage block 61 is mounted on the valve base 12, the joint seal members 71 to 73 are fitted into the respective connecting holes 64 to 66 of the flow passage block 61. Therefore, when changing a gap between the valve base 12 and the flow passage block 61, the protruding seal parts 75 and 76 of the joint seal members 71 to 73 are only moved in an axial direction in the inside of the connecting holes 64 to 66, and the air can be prevented surely from leaking out from between the valve base 12 and the flow passage block 61.

In the flow passage block 61 shown in FIG. 3, provided are the air flow passage 64a which communicates with the output hole 31, the air flow passage 65a which communicates with the common air supply flow passage and the air flow passage 66a which communicates with the common exhaust flow passage. Therefore, by mounting the flow passage block 61 on the manifold solenoid valve 10, the air flow passage can be made to communicate with the output joint 36, etc. without connecting a hose and pipe to the output joint 36 etc. However, only the air flow passages 64a which communicate with the output holes 31 may be made to be provided to the flow passage block 61. In that case, tubes are directly mounted on the air supply joint 37 and the exhaust joint 38. In addition, although each of the air flow passages 64a, 65a and 66a is shown as a simple straight flow passage in the flow passage block 61, an air flow passage having an optional shape can be provided to the flow passage block 61.

Figure 9:
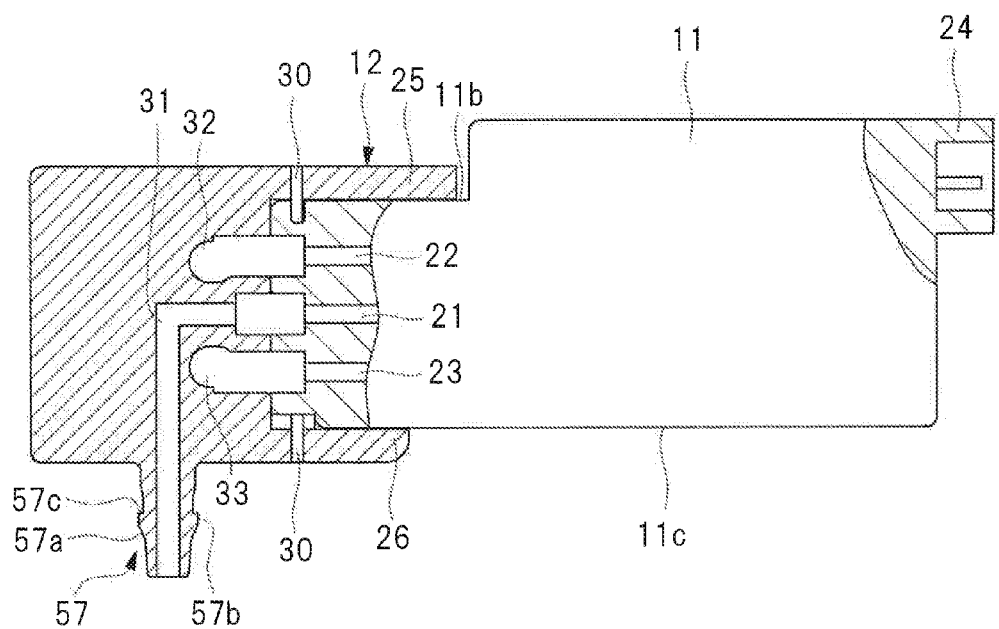
FIG. 9 is a sectional view showing a valve base according to another embodiment.

FIG. 9 is a sectional view illustrating another embodiment of the valve base 12. This valve base 12 has the output joint 36 provided so as to protrude from the bottom side face 11c of the valve base 12. Other structures are the same as those of the above mentioned valve base 12. In the configuration shown in FIG. 9, the flow passage block 61 is mounted on the bottom side face 11c of the valve base 12. When the air supply joint 37 and exhaust joint 38 is also provided so as to protrude from the bottom face of the end blocks 15 and 16, by mounting the flow passage block 61 on the manifold solenoid valve 10, supply of the air to each of the solenoid valves 11 and discharging of the air discharged from the solenoid valve 11 can be performed by the flow passage block 61. The output joint 36, air supply joint 37 and exhaust joint 38 may be made to be provided each on the surface 11b of the valve base 12.

The present invention is not limited to the above-mentioned embodiments, and can be modified variously in the range without departing from the substance. For example, although the air supply joint 37 and exhaust joint 38 are provided on the end blocks 15 and 16 which are mounted on both end faces of the valve base assembly 14, the air supply joint 37 and exhaust joint 38 may be made to be provided on one end block.

EXPLANATION OF REFERENCES 10 manifold solenoid valve
11 solenoid valve
12 valve base
13 connecting attachment
14 valve base assembly
15 and 16 end blocks
21 output port
22 air supply port
23 exhaust port
30 fastener
31 output hole
32 air supply hole
33 exhaust hole
36 output joint
37 air supply joint
38 exhaust joint
41 first protruding part
42 second protruding part
43 and 44 concave grooves
45 central part
46 and 47 side parts in width direction
50 connecting piece
51 first clamp piece
52 second clamp piece
53 and 54 claw parts
55 bent part
56 cutout part
57 engaging protruding part
61 flow passage block
64 to 66 connecting holes
64a to 66a air flow passages

71 to 73 joint seal member
74 recess part
75 protruding seal part
76 protruding seal part

What is claimed is:

1. A manifold solenoid valve having an aggregation of two or more solenoid valves mounted respectively to back sides of two or more valve bases, in which a manifold is assembled by connecting each valve base side-by-side to an adjacent valve base with a connecting attachment at a front side of the adjacent valve bases, wherein
    each valve base is provided with: an air supply hole to form a common air supply flow passage which communicates with an air supply port of a corresponding solenoid valve; an exhaust hole to form a common exhaust flow passage which communicates with an exhaust port of the corresponding solenoid valve; and an output hole which communicates with an output port of the corresponding solenoid valve,
    each valve base has two oppositely disposed side parts mating with the side parts of adjacent valve bases in the assembled manifold, each side part of a valve base extending from a front to a back of the valve base and from a top to a bottom of the valve base;
    each side part at the top front of each valve base is provided with a first protruding part extending in a front-back direction, and each side part at the bottom front of each valve base is provided with a second protruding part extending in a front-back direction, and
    the connecting attachment being a one piece element having a first clamp portion which has two claw parts engaging with the first protruding parts of valve bases adjacent to each other; and a second clamp portion which has two claw parts engaging with the second protruding parts of valve bases adjacent to each other; and a connecting portion which faces part of a front face of one of two valve bases adjacent to each other, and part of a front face of the other of said two valve bases,
the first clamp portion, the second clamp portion, and the connecting portion are integral with each other.

2. The manifold solenoid valve according to claim 1, wherein each valve base has a central part interposed between the two oppositely disposed side parts, and the width of the central part of the valve base between the side parts is greater than the width dimension of each side part.

3. The manifold solenoid valve according to claim 1, wherein an output joint which communicates with the output hole is provided at a central part of the front face of each valve base, and each side part in which the connecting portion is received is recessed from the front face.

4. The manifold solenoid valve according to claim 3, wherein a cutout part is formed at both sides of the connecting portion, and the output joint is received in the cutout part.

5. The manifold solenoid valve according to claim 1, wherein end blocks are mounted on respective ends of a valve base assembly of two or more valve bases connected so as to abut each other, one of the end blocks is provided with an air supply joint which communicates with an air supply hole of each valve base, and the other of the end blocks is provided with an exhaust joint which communicates with an exhaust hole of each valve base.

6. The manifold solenoid valve according to claim 1, wherein:
    each valve base has:
        a first fixing piece protruding in a backward direction;
        a second fixing piece protruding in the backward direction; and
        an abutting face extending between the first fixing piece and the second fixing piece; and
    each solenoid valve is mounted on a corresponding valve base by placing a front face of said solenoid valve against the abutting face of said valve base with said solenoid valve sandwiched between the first fixing piece and the second fixing piece.

* * * * *

UNITED STATES PATENT AND TRADEMARK OFFICE
CERTIFICATE OF CORRECTION

PATENT NO. : 9,689,503 B2  
APPLICATION NO. : 14/669024  
DATED : June 27, 2017  
INVENTOR(S) : Joji Inaba Page 1 of 1

It is certified that error appears in the above-identified patent and that said Letters Patent is hereby corrected as shown below:

In the Claims

In Column 11, Claim 1, at Line 2 please insert --a-- after "respectively to" and before "back."

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*